US008510396B2

(12) United States Patent
Lim et al.

(10) Patent No.: US 8,510,396 B2
(45) Date of Patent: Aug. 13, 2013

(54) APPARATUS AND METHOD FOR STORING CONTENT FLIP LIST OF DIGITAL MEDIA SERVER USING USER INPUT FEEDBACK

(75) Inventors: Byung-Soo Lim, Gyeonggi-do (KR); Ki-Chul Park, Gyeonggi-do (KR); Sang-Won Ahn, Gyeonggi-do (KR); Tae-Hwan Hwang, Gyeonggi-do (KR); In-Young Shin, Gyeonggi-do (KR); Joon-Oo Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 335 days.

(21) Appl. No.: 12/859,439

(22) Filed: Aug. 19, 2010

(65) Prior Publication Data

US 2011/0047231 A1 Feb. 24, 2011

(30) Foreign Application Priority Data

Aug. 19, 2009 (KR) ........................ 10-2009-0076821

(51) Int. Cl.
*G06F 15/16* (2006.01)
(52) U.S. Cl.
USPC .......................................................... 709/206

(58) Field of Classification Search
USPC .......................................................... 709/206
See application file for complete search history.

(56) References Cited

U.S. PATENT DOCUMENTS

| 6,407,757 | B1* | 6/2002 | Ho .................................. 715/776 |
| 8,209,623 | B2* | 6/2012 | Barletta et al. ................. 715/776 |
| 2007/0282945 | A1* | 12/2007 | Bisht .............................. 709/203 |
| 2009/0037382 | A1* | 2/2009 | Ansari et al. ...................... 707/3 |
| 2010/0185987 | A1 | 7/2010 | Yang et al. |
| 2010/0278443 | A1* | 11/2010 | Pascali et al. ................. 382/233 |
| 2012/0260220 | A1* | 10/2012 | Griffin .......................... 715/863 |

FOREIGN PATENT DOCUMENTS

| KR | 1020070048449 | 5/2007 |
| KR | 1020100085602 | 7/2010 |

* cited by examiner

*Primary Examiner* — Imad Hussain
(74) *Attorney, Agent, or Firm* — The Farrell Law Firm, P.C.

(57) ABSTRACT

Provided is a method for storing a content flip list of a digital media server using user input feedback. The method includes receiving a content request message from a user and transmitting the received request message to a media server, converting information received as a response to the request message into a page format, defining the converted information as a current page, and receiving and storing previous and next pages of the current page, and outputting the received current page through an output part.

12 Claims, 8 Drawing Sheets

APPARATUS AND METHOD FOR STORING CONTENT FLIP LIST OF DIGITAL MEDIA SERVER USING USER INPUT FEEDBACK

PRIORITY

This application claims priority under 35 U.S.C. §119(a) to a Korean Patent Application filed in the Korean Intellectual Property Office on Aug. 19, 2009 and assigned Ser. No. 10-2009-0076821, the contents of which are incorporated herein by reference.

BACKGROUND OF THE INVENTION

1. Field of the Invention

The present invention relates generally to a Digital Living Network Alliance (DLNA) home network system, and more particularly, to a method for rapidly and accurately transmitting to a user a content list within a specific folder contained in a digital media server in a DLNA home network system.

2. Description of the Related Art

With the development of communication technologies, a method is used for establishing a network between electronic devices and integrating/managing the electronic devices using a controller for controlling the network. A system for integrating and managing electronic devices by establishing a network is called a home network system. The home network system connects various network electronic devices (e.g., TVs, washing machines, microwave ovens, gas stoves, audio systems, air conditioners, and boilers), lights, gas valves, front door, etc. to a controller such as a home gateway or a home server and controls those devices through a specific terminal (e.g., a remote controller).

Recently, the home network system has been standardized and, particularly, a DLNA for controlling electronic devices (e.g., TVs, Video Tape Recorders (VTRs), digital cameras, and audio systems) within a house has been proposed.

In a DLNA home network system, which is in commercial use, a content sharing method has a constant, individual flow, for example as shown in FIG. 1.

FIG. 1 is a flow chart illustrating a content sharing process in a conventional DLNA network system. The DLNA system includes a media player 11, a media server 13, and a device 15.

Referring to FIG. 1, the media player 11 receives a search command for a specific content from a user in step 101. The media player 11 transmits, in step 103, a request message for searching the specific content to the media server 13 in which the specific content is stored. The search request for the user content may be made only to one media server or may be simultaneously made to a plurality of media servers.

In step 105, the media server 13 configures a content item list result set for contents of all stored media formats by using a content directory service based on information about the specific content included in the received request message and transmits the result set to the media player 11. In step 107, the media player 11 displays the content item list result set received from the media server 13 through a user interface.

If one or more content lists among the content item lists displayed through the user interface are selected by a user in step 109, the media player 11 transmits a content information message including the selected content lists to the device 15 which can reproduce the corresponding content in step 111. The device 15 analyzes and stores the content lists included in the content information message received from the media player 11 in step 113.

In step 115, if there is a reproduction command for any content among the content lists selected by the user, the media player 111 reproduces the corresponding content. If there is a reproduction stop command by the user, the media player 11 stops reproducing the corresponding content in step 117. The media player 11 transmits, in step 119, a content reproduction stop information message including information about the stopped reproduction content to the device 15. The information about the content may include data and a stopped position of the corresponding content.

The device 15 analyzes and stores the content information included in the content reproduction stop information message received from the media player 11 in step 119. In FIG. 1, the media player 11 may be included in the media server 13 or in the device 15 according to the user environment.

The sharing of contents in the DLNA network system is performed by the above procedures. However, a content directory service for acquiring content information is slow in such a system. Namely, since 9 items, such as a name, a transmission Identification (ID), a destination ID, etc., must necessarily be acquired with respect to a corresponding content, it takes a significant amount of time to analyze and store these processes.

FIG. 2 is an diagram illustrating a process for searching and reproducing a specific content in a conventional DLNA network system.

Referring to FIG. 2, since a content directory service from step 201 to step 207 generates a large amount of data structures and requires syntax analysis with respect to each content, much time is correspondingly consumed. Especially, in step 209 in which the final content list is displayed, considerable time is consumed if there are a large amount of contents in the final destination. In step 211, a selected content is reproduced.

In this way, the content directory service requires considerable time. To improve the above problem in the content directory service, a method for reducing the standby time generated to search for the desired content when a large amount of contents are included in a specific folder is needed.

SUMMARY OF THE INVENTION

An aspect of the present invention is to address at least the above-mentioned problems and/or disadvantages and to provide at least the advantages described below. Accordingly, an aspect of the present invention provides an apparatus and method for reducing a standby time of a content search by adjusting the number of necessary pages and the number of pages according to user input strength using both a main screen storage and a dual flipping buffer serving as an intermediate buffer.

In accordance with an aspect of embodiments of the present invention, a method for storing a content flip list of a digital media server using user input feedback includes receiving a content request message from a user and transmitting the received request message to a media server, converting information received as a response to the request message into a page format, defining the converted information as a current page, and receiving and storing previous and next pages of the current page, and outputting the received current page through an output part.

In accordance with another aspect of embodiments of the present invention, an apparatus for storing a content flip list of a digital media server using user input feedback includes a page flipping module for receiving a content request message from an input part and transmitting the received request message to a media server, a dual flipping buffer for converting information received as a response to the request message into a page format, defining the converted information as a current page, and receiving previous and next pages of the current page, and a main screen storage for receiving and outputting the current page through an output part.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The embodiments of the present invention will now be discussed with reference to the accompanying drawings. The following detailed description includes specific details in order to provide a thorough understanding of the present invention. However, it will be apparent to those skilled in the art that the present invention may be practiced without such specific details.

Figure 1:
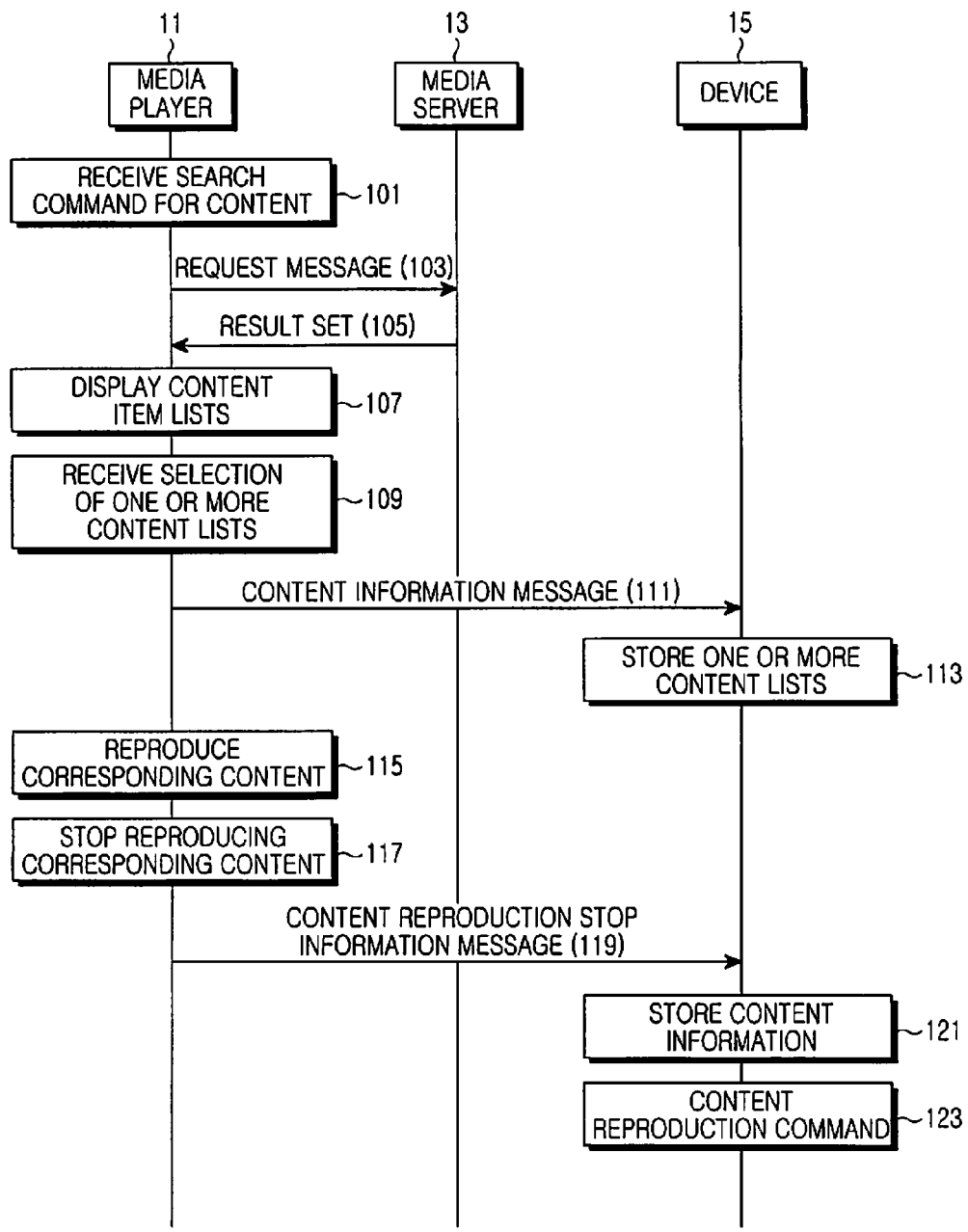
FIG. 1 is a flow chart illustrating a content sharing process in a conventional DLNA network system.
Figure 2:
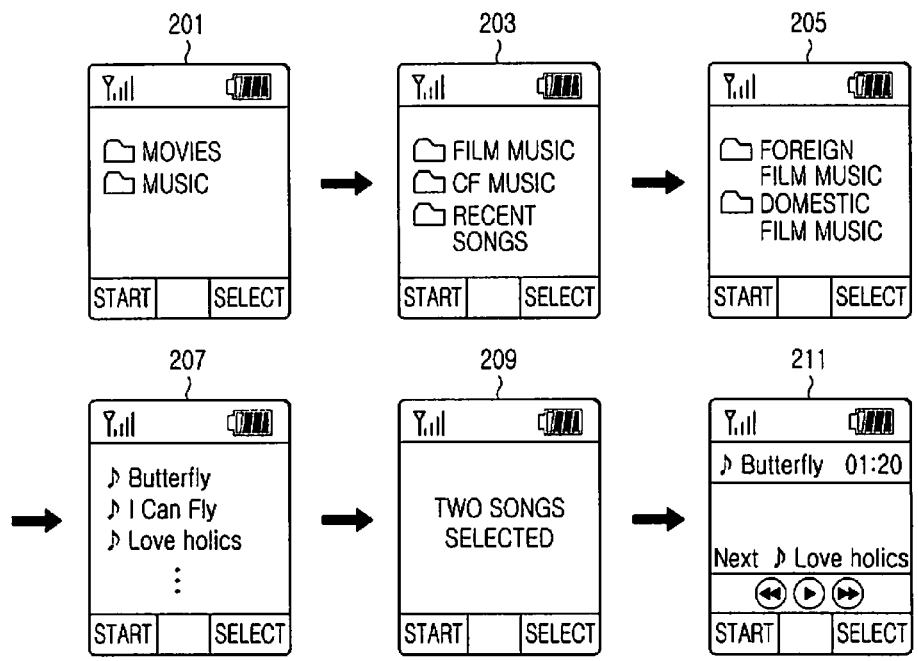
FIG. 2 is a diagram illustrating a process for searching and reproducing specific content in a conventional DLNA network system.
Figure 3:
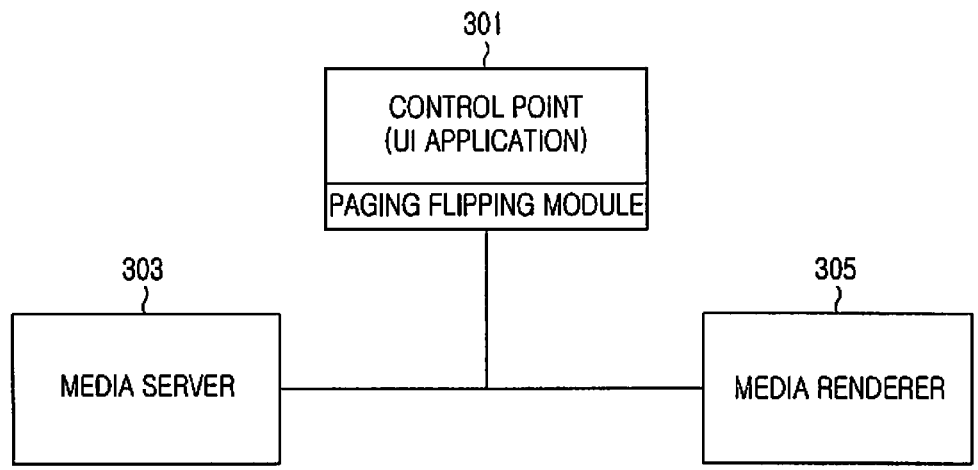
FIG. 3 is a block diagram of a DLNA network system according to an embodiment of the present invention.

FIG. 3 is a block diagram of a DLNA network system according to an embodiment of the present invention. The DLNA network system includes a control point 301, a media server 303, and a media renderer 305. The control point 301 includes a page flipping module which is a characteristic configuration of the present invention. The control point 301 may be independently constructed or may be included in any one of the media server 303 and the media renderer 305. The control point will now be described in detail.

Figure 4:
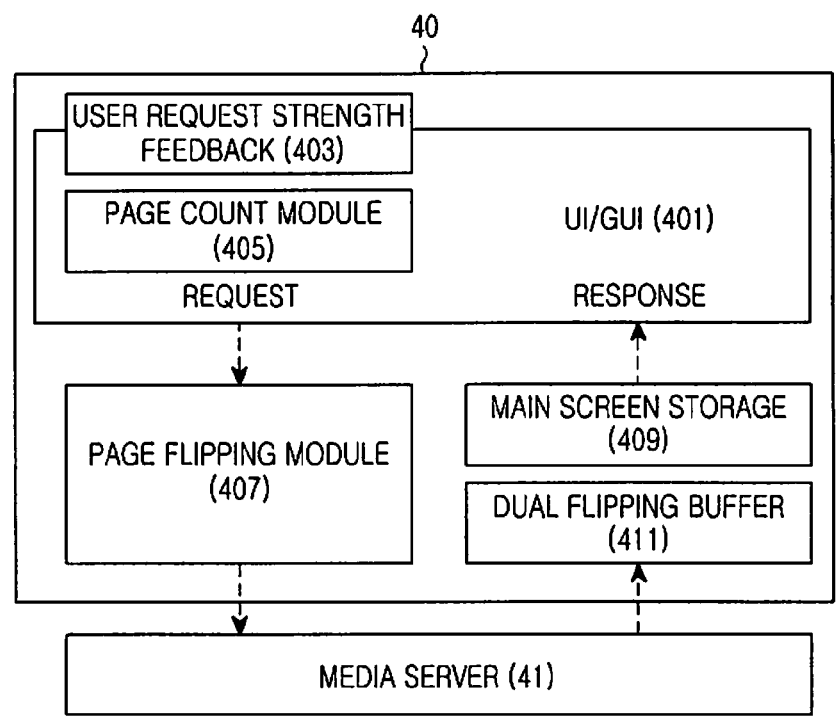
FIG. 4 is a block diagram illustrating an internal construction of a control point of a DLNA network system according to an embodiment of the present invention.

FIG. 4 is a block diagram illustrating an internal construction cola control point of a DLNA network system according to an embodiment of the present invention. A control point 40 includes a User Interface (UI)/Graphic User Interface (GUI) 401, a page flipping module 407, a main screen storage 409, and a dual flipping buffer 411. An encoder, a decoder, a transceiver necessary to communicate with a media server 41 have been omitted.

In FIG. 4, the UI/GUI 401 refers to a medium for the input/output of a device including a mobile terminal that uses a touch type input/output scheme in the present invention.

The UI/GUI 401 includes a user request strength, e.g. the amount of force applied by the user, feedback 403 and a page count module 405. When a touch scheme is used as the input of the device, the user request strength feedback 403 senses the strength of touch input by a user and transmits the strength of touch to the page count module 405. The strength of touch may be divided into levels based on preset threshold values. The page count module 405 adjusts the amount of pages stored in the dual flipping butler 411 according to the strength of touch input to the user request strength feedback 403.

For example, the strength of touch may be divided into three levels. If the strength of touch is weak, one page before a current page and one page after the current page are stored in the dual flipping module 411. If the strength of touch is intermediate, two pages before the current page and two pages after the current page are stored in the dual flipping module 411. In the present invention, the strength of user input is divided into three levels, that is, high, intermediate, and low, and the amount of pages stored in the buffer 411 is changed according to the strength of user input, so that a rapid view can be provided to a user. In this way, the unit of pages stored in the dual flipping buffer 411 varies according to the strength of user input. When the input strength is divided into three levels, the unit of stored pages may be one, two, or three times.

The page flipping module 407 serves to flip pages on a screen. If a user input is requested, the UI/GUI 401 transmits a request message to the page flipping module 407 and the page flipping module 407 transmits the received request message to the media server 41, in order to provide a content directory service to the user. Since the number of contents which can be viewed on one screen is limited due to the characteristics of a device such as a mobile terminal, contents viewed on one screen are defined as one page in consideration of the characteristics of the device and a page flipping scheme configured as if the user turns over pages is implemented in the page flipping module 407.

The main screen storage 409 temporarily stores a current page to be viewed on a display of a device such as a mobile terminal and transmits information about the current page to the UI/GUI 401. The current page stored in the main screen storage 409 is output on an output part, e.g., a screen, through a video pointer so that the user can view the current page.

The current page stored in the main screen storage 409 is received from the dual flipping buffer 411. The dual flipping buffer 411 stores a previous page and a next page together with a currently displayed page on the display. This enables rapid response when the user desires to move from a current page to a previous or next page.

Furthermore, one page of a higher container (e.g., a folder) and one page of a lower container (e.g., a folder) may be stored in the dual flipping buffer 411 to rapidly perform movement between containers. Although not shown in the drawing, the dual flipping buffer 411 includes a dual page flipping buffer for storing previous and next pages of a current page and a parent/child container page buffer for storing pages of a higher folder and a lower folder or content of a folder in which a current page is located. A plurality of pages stored in the dual page flipping buffer is shown via horizontal movement between pages, and a plurality of pages stored in the parent/child container page buffer is shown via vertical movement between pages.

Figure 5A:
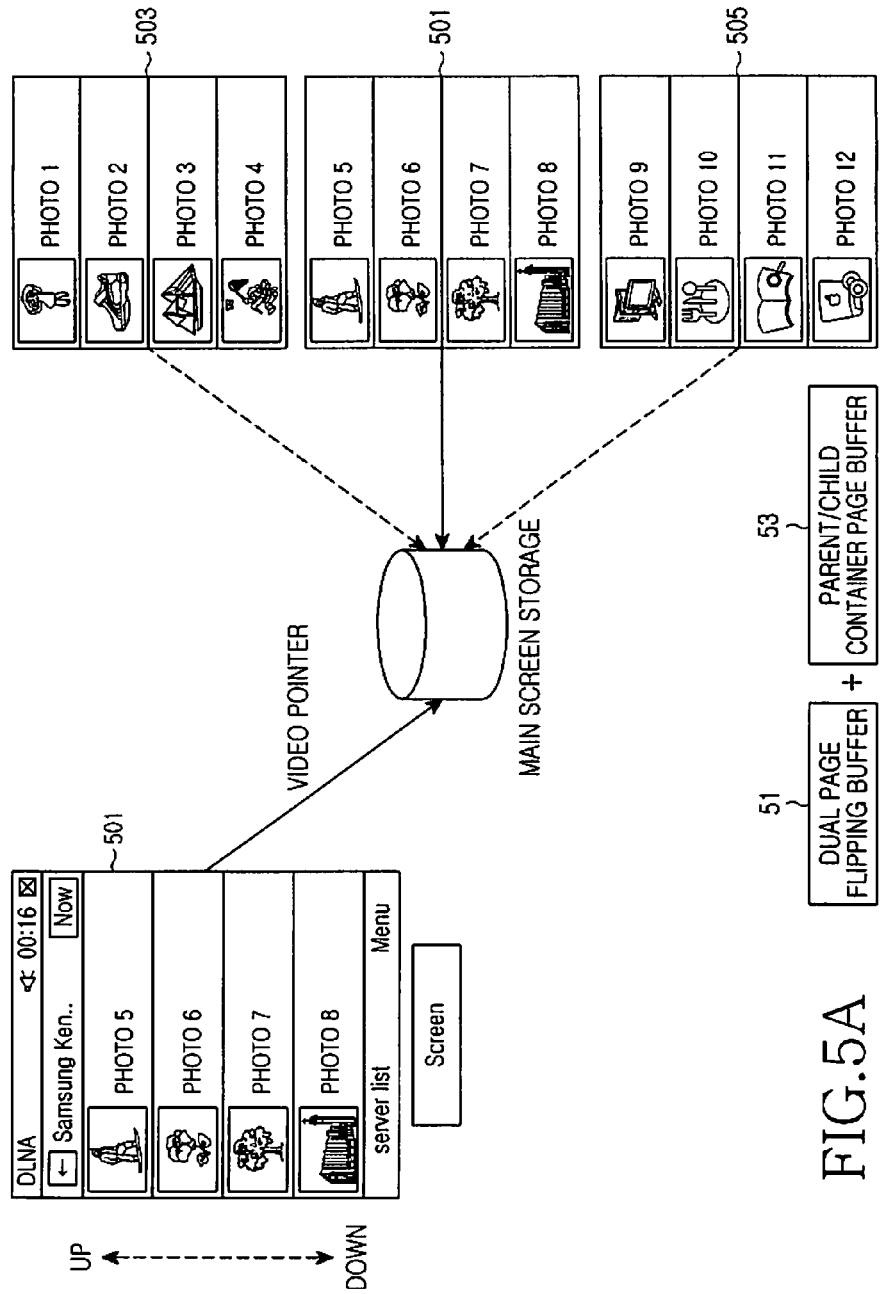
FIGS. 5A and 5B are diagrams illustrating an output of a current page and storage of previous and next pages in a DLNA network system according to an embodiment of the present invention.
Figure 5B:
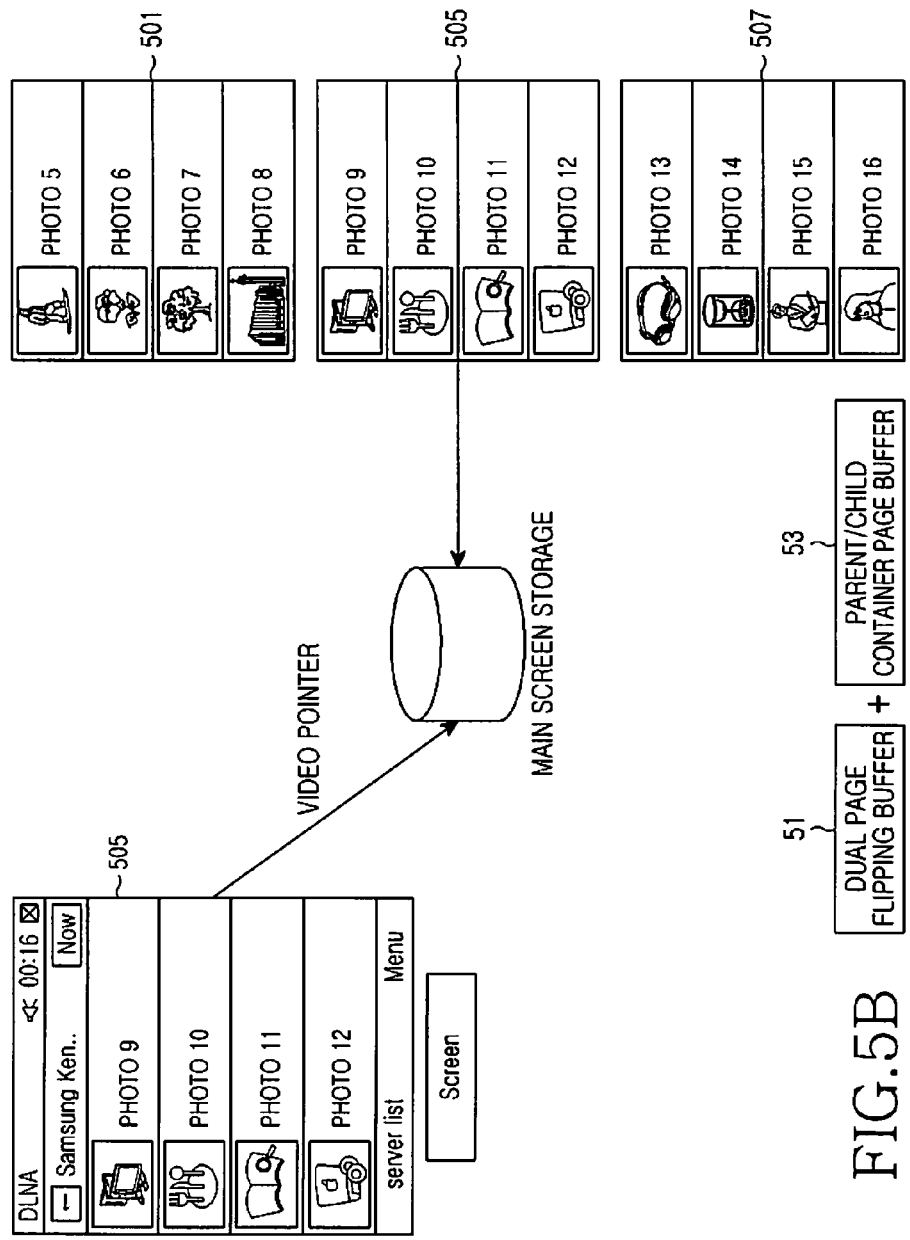

FIGS. 5A and 5B are diagrams illustrating an output of a current page and storage of previous and next pages in a DLNA network system according to an embodiment of the present invention.

Referring to FIG. 5A, a screen of an output part of a device in a DLNA network system displays a current page 501 stored in a main screen storage through a video pointer. In FIG. 5A, the current page 501 includes 4 contents from Photo 5 to Photo 8, which are defined as one page. When an initially defined current page 501 is received from a media server, the current page 501 may proceed to a previous page 503 or a next page 505 according to the touch of the previous page 503 or the next page 505 or a key input. The previous page 503 and the next page 505 are stored in a dual page flipping buffer 51. Although not shown in the drawing, a start page corresponding to a parent folder and a child folder or content of a folder in which the current page is located is stored in a parent/child container page buffer 53.

FIG. 5B illustrates a process in which a next page 505 is updated to a new current page 505 and stored in a main screen storage when a user selects movement to the next page. In this case, the main screen storage deletes the page stored in FIG. 5A and updates a new current page. Namely, if the user demands to search other contents, the main screen storage refers to and updates a page corresponding to the old next page 505 from the old current page 501 in the dual page flipping buffer 51 and simultaneously updates a previous page 501 and a next page 507 of a new current page 505.

When a current page is updated, the flipping module 407 of FIG. 4 receives a next page of the newly updated current page from the media server 41. Although not shown in FIG. 5B, a start page corresponding to a parent folder and a child folder or content of a folder in which a current page is located is stored in the parent/child container page buffer 53. The size of a memory of the dual page flipping buffer 51 and the parent/child container page buffer 53 may be calculated by the following Equation (1).

$$\alpha = 3(MI \times NI) + \sum_{\alpha=1}^{NDC}(MI_\alpha \times NI_\alpha) + \sum_{\beta=1}^{NUM}(MI_\beta \times NI_\beta) \quad (1)$$

In Equation (1), $\alpha$ denotes a total memory buffer, MI denotes a memory occupied by one item, NI denotes the number of items of one pages, NDC denotes the number of lower containers, and NUC denotes the number of upper containers.] When input strength is divided into three levels in a touch-based device, an intermediate level corresponds to twice the unit of the dual page flipping buffer. Namely, in Equation 1, $\alpha$ is changed to $2\alpha$.

Through the above-described method, search speed between containers as well as within one container can be increased. Hereinafter, a parent/child page buffer for storing parent/child folders or contents to facilitate movement between containers will now be described.

Figure 6:
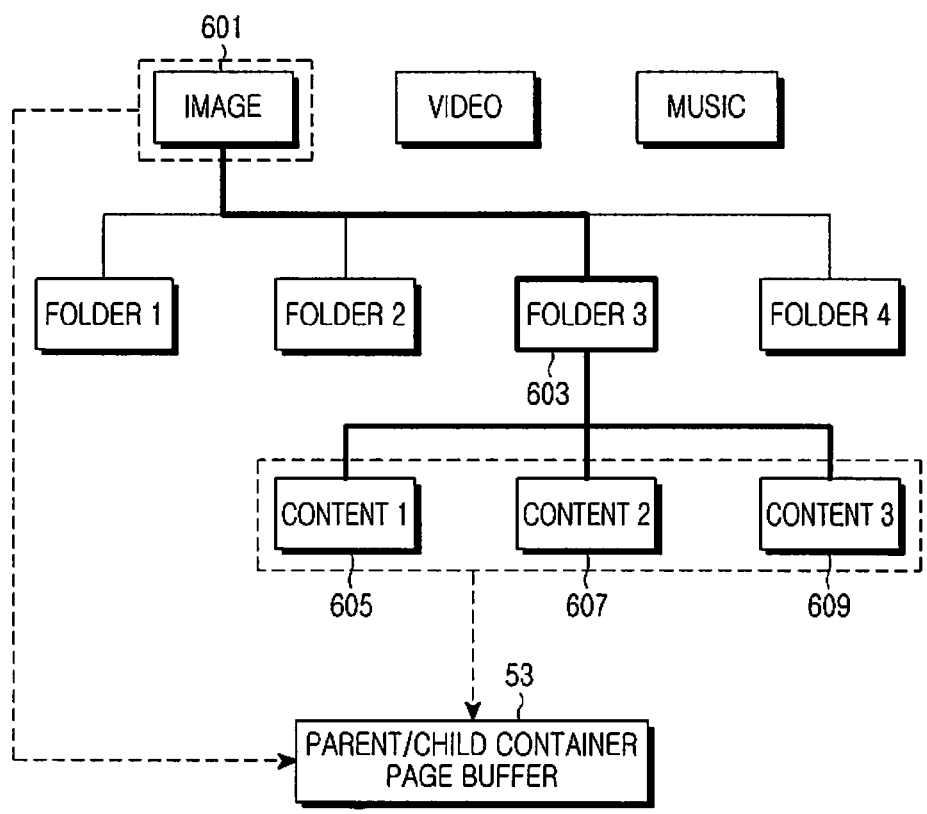
FIG. 6 is an diagram illustrating the storage items of a parent/child container page buffer in a DLNA network system according to an embodiment of the present invention.

FIG. 6 is an exemplary diagram illustrating the storage items of a parent/child container page buffer in a DLNA network system according to an embodiment of the present invention.

Referring to FIG. 6, assuming that a container in which a current page is located is a third folder 603, a start page corresponding to an image folder 601, which is a parent container of the third folder 603, and first to third contents 605, 607 and 609, which are child containers of the folder 603 is stored in a parent/child container page buffer 53. If a container in which the current page is located is changed to the image folder 601 by user setting, a higher folder of the image folder 601 becomes a parent container, and first, second and fourth folders as well as the third folder 603 become child containers.

A process for storing and changing a current page and previous/next pages will now be described with reference to the internal configuration and exemplary diagram of the control point in a DLNA network system.

Figure 7:
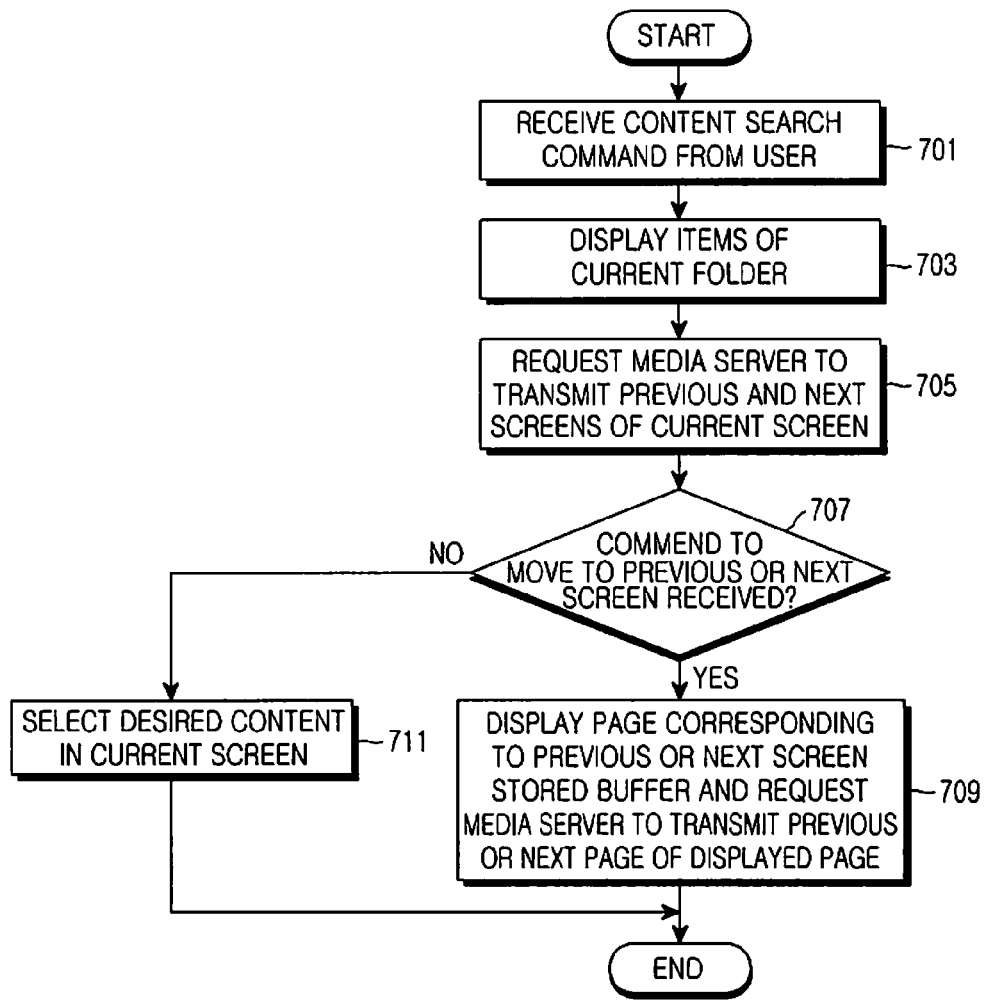
FIG. 7 is a flow chart illustrating a process for storing and changing a current page and previous/next pages in a DLNA network system according to an embodiment of the present invention.

FIG. 7 is a flow chart illustrating a process for storing and changing a current page and previous/next pages in a DLNA network system according to an embodiment of the present invention.

Referring to FIG. 7, a control point receives a content search command for from a user in step 701. The content search command is received through a button or touch screen of a corresponding device. The control point transmits a request message including the content search command to a media server using a page flipping module. The control point defines the contents of a current folder in a page form and displays them in step 703. Here, the contents displayed on one screen is defined as one page in consideration of characteristics of a device such as a mobile terminal in which the number of contents viewed on one screen is limited. The control point receives a page corresponding to a current screen and requests a media server to transmit pages corresponding to previous and next screens. The pages corresponding to the current, previous and next screens are stored in the dual flipping buffer of the control point.

A user determines whether to proceed to a previous or next screen by determining whether a desired content is present in a current page. Namely, if a command for movement to the previous or next screen is not received in step 707, the control point selects the desired content from the current screen in step 711.

If a command for movement to the previous or next screen is received in step 707, the control point displays a page corresponding to a previous or next screen stored in the dual flipping buffer as a current page and requests the media server to transmit a previous or next page based on the new current page in step 709. The number of pages stored in the dual flipping buffer may vary according to user setting. When a touch based device is used, the page movement may vary according to the strength of touch. If the strength of touch is classified into weak, intermediate, and strong, weak touch may mean the movement to the next page, intermediate touch may mean movement to the page after the next page, and strong touch may mean that a current page is set by directly accessing the media server without using the dual flipping buffer. If a current page is set, the previous and next pages of the current page are automatically updated in the dual flipping buffer. For example, strong user input is applied when a user desires to rapidly flip lots of pages and a video pointer may designate a part corresponding to the fourth page. The designation of a page according to the strength of touch may be differently applied by user setting.

According to the method of the present invention, a space area corresponding to twice a page based on an initial start area is viewed by improving a conventional content directory service for viewing a specific area (folder). This can offer an optimized user interface for rapid search and thumbnail as well as an optimized content view user interface in a DLNA network system in which a network environment is indispensable. Moreover, the size of a cached buffer can be adjusted and reconstructed according to the strength of user input.

The apparatus and method for storing a content flip list of a digital media server using user input feedback can be implemented as described above. Although the exemplary embodiments of the present invention have been disclosed for illustrative purposes, various modifications, additions and substitutions are possible, without departing from the scope and spirit of the invention as disclosed in the accompanying claims. Accordingly, the scope of the present invention should not be limited to the description of the embodiment, but defined by the accompanying claims and equivalents thereof.

According to the present invention, contents to be displayed on a screen is set in units of pages in a content directory service consuming considerable time in a DLNA network system and previous and next pages of a current page are previously received. Therefore, the content directory service can be rapidly and easily accessed only by a simple and intuitive command.

What is claimed is:

1. A method for storing a content flip list of a digital media server using user input feedback, the method comprising:
   receiving a content request message from a user and transmitting the received request message to a media server;
   converting information received as a response to the request message into a page format, defining the converted information as a current page, and receiving and storing previous and next pages of the current page;
   outputting the received current page through an output part;
   determining input strength entered by a user and transmitting the input strength; and
   determining multiples of pages to be stored according to the determined input strength.

2. The method of claim 1, wherein the input strength is divided into preset levels based on one or more preset threshold values, and the multiples of pages to be stored vary according to the respective levels.

3. The method of claim 1, wherein the determination of the multiples of pages comprises:
   including information about the determined multiples of pages in the content request message.

4. The method of claim 1, wherein the transmission of the request message comprises:
   requesting the media server to transmit a previous or next page of a current page when the current page is changed by user input.

5. The method of claim 1, further comprising storing a current folder in which the current page is included, and parent and child folders of the current folder in units of pages.

6. An apparatus for storing a content flip list of a digital media server using user input feedback, the apparatus comprising:
   a page flipping module for receiving a content request message from an input part and transmitting the received request message to a media server;
   a dual flipping buffer for converting information received as a response to the request message into a page format, defining the converted information as a current page, and receiving previous and next pages of the current page;
   a main screen storage for receiving and outputting the current page through an output part;
   a user request strength feedback for determining input strength entered through the input part and transmitting the input strength; and
   a page count module for determining multiples of pages to be stored in the dual flipping buffer according to the input strength received from the user request strength feedback.

7. The apparatus of claim 6, wherein the input strength is divided into preset levels based on one or more preset threshold values, and the multiples of pages to be stored vary according to the respective levels.

8. The apparatus of claim 6, wherein the page count module includes information about the determined multiples of pages in the content request message and transmits the content request message to the page flipping module.

9. The apparatus of claim 6, wherein the page flipping module requests the media server to transmit a previous or next page of a current page when the current page is changed by user input.

10. The apparatus of claim 6, wherein the dual flipping buffer comprises:
    a dual flipping module for storing the current, previous, and next pages; and
    a parent/child container page buffer for storing a current folder in which the current page is included, and parent and child folders of the current folder in units of pages.

11. The apparatus of claim 6 wherein the size of a memory of the dual page flipping buffer is calculated by:

$$\alpha = 3(MI \times NI) + \sum_{\alpha=1}^{NDC}(MI_\alpha \times NI_\alpha) + \sum_{\beta=1}^{NUC}(MI_\beta \times NI_\beta),$$

where ... α denotes a total memory buffer, MI denotes a memory occupied by one item, NI denotes the number of items of one pages, NDC denotes the number of lower containers, and NUC denotes the number of upper containers.

12. The apparatus of claim 10 wherein the size of a memory of the parent/child container page buffer is calculated by:

$$\alpha = 3(MI \times NI) + \sum_{\alpha=1}^{NDC}(MI_\alpha \times NI_\alpha) + \sum_{\beta=1}^{NUC}(MI_\beta \times NI_\beta),$$

where ... α denotes a total memory buffer, MI denotes a memory occupied by one item, NI denotes the number of items of one pages, NDC denotes the number of lower containers, and NUC denotes the number of upper containers.

* * * * *